United States Patent [19]

Urai

[11] Patent Number: 4,867,508
[45] Date of Patent: Sep. 19, 1989

[54] SEAT WITH COVER SECURED THERETO

[75] Inventor: Muneharu Urai, Akishima, Japan

[73] Assignee: Tachi-S Co., Ltd., Japan

[21] Appl. No.: 177,852

[22] Filed: Apr. 1, 1988

Related U.S. Application Data

[63] Continuation of Ser. No. 2,398, filed as PCT JP 86/00239 on May 9, 1986, published as No. 86/06709 on Nov. 20, 1986, abandoned.

[30] Foreign Application Priority Data

May 9, 1985 [JP] Japan ................................. 60-96637

[51] Int. Cl.$^4$ ............................................. A47C 27/14
[52] U.S. Cl. .................................... 297/452; 297/459; 5/481
[58] Field of Search ............... 297/218, 219, 452, 458, 297/459, DIG. 1; 5/448, 481, 482

[56] References Cited

U.S. PATENT DOCUMENTS

| | | | |
|---|---|---|---|
| 2,921,403 | 1/1960 | Cunningham | 297/DIG. 1 X |
| 3,191,197 | 6/1965 | Levy | 297/DIG. 1 X |
| 3,529,866 | 9/1970 | Getz | 297/452 |
| 3,612,607 | 10/1971 | Lohr | 297/452 |
| 3,649,974 | 3/1972 | Baruth et al. | 297/458 X |
| 4,403,356 | 9/1983 | Urai | 297/458 X |
| 4,534,595 | 8/1985 | Abe et al. | 297/DIG. 1 X |
| 4,541,885 | 9/1985 | Caudill, Jr. | 5/471 X |
| 4,579,388 | 4/1986 | Urai | 297/452 |
| 4,606,580 | 8/1986 | Yoshizawa | 297/458 |
| 4,609,226 | 9/1986 | Yoshizawa | 297/458 X |

Primary Examiner—Peter R. Brown
Attorney, Agent, or Firm—Oldham & Oldham Co.

[57] ABSTRACT

A seat comprising a cover member (3) bonded to a molded polyurethane foam (2) along a surface of the latter, wherein, instead of a continuous one-piece cover member, a cover member cut and split into individual parts or a locally-cut cover member is used, and portions of the cover member parts to be bonded or necessary portions of the locally-cut cover members are buried and fixed in grooves of the molded polyurethane foam (2) to construct a three-dimensional seat shape.

5 Claims, 7 Drawing Sheets

SEAT WITH COVER SECURED THERETO

This is a continuation of co-pending patent application, Ser. No. 2,398, filed as PCT JP86/00239 on May 9, 1986, WO86/06709 on Nov. 20, 1986, now abandoned.

TECHNICAL FIELD

This invention relates to a seat, and more particularly to a bucket seat for use in an automotive vehicle. That is, the present invention provides a seat of the kind described above which can be manufactured compactly and easily without requiring the skill and some steps including plane-developed pattern cutting and subsequent combining and finishing which have been required hitherto for the manufacture of such a seat.

BACKGROUND ART

Prior art seats will be described with reference to FIGS. 14 to 16.

Figure 14A:
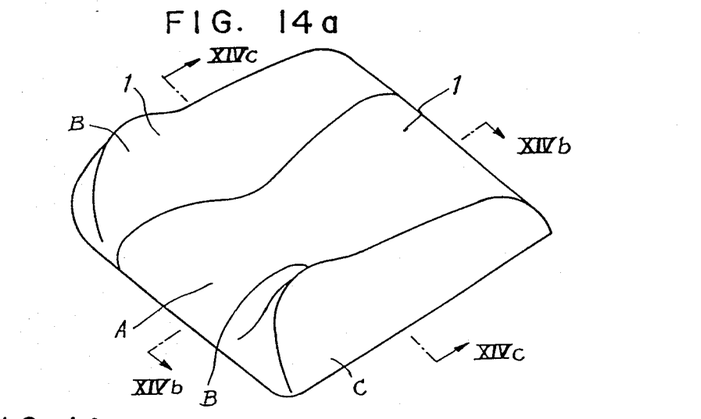
FIG. 14a is a perspective view of a seat.
Figure 14B:
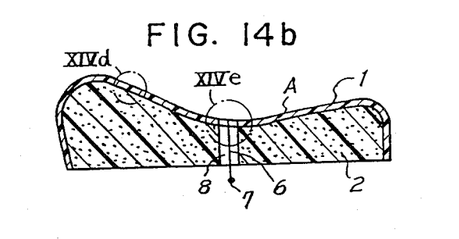
FIG. 14b is a sectional view taken along the line XIVb—XIVb in FIG. 14a, FIG. 14c is a sectional view taken along the line XIVc—XIVc in FIG. 14a, FIG. 14d is an enlarged view of a portion XIVd in FIG. 14b.
Figures 14C, 14D:
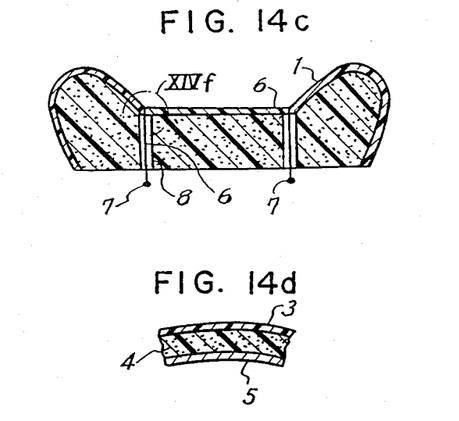

A first prior art example shown in FIGS. 14a to 14f represents a seating part of a bucket seat for use in an automotive vehicle. Therefore, this seat has a seat base part A, flap parts B and side parts C. As shown in FIGS. 14b and 14c, the internal structure of the seat includes a trim cover 1 mounted on a surface of a so-called molded polyurethane foam 2 obtained by foaming and molding a polyurethane resin in a mold (which foam may be replaced by a so-called shaped slab cut from a block of a foamed polyurethane resin). As shown in FIG. 14d, the trim cover 1 is composed of a cover member 3, a filler pad 4 and a backing cloth 5. As shown in FIG. 14a, this seat has a complex three-dimensional shape, and the entire trim cover 1 is provided by preparing an element cut into a developed shape of the seat base part A, elements cut into developed shapes of the left and right flap parts B and elements cut into developed shapes of the left and right side parts C, and sewing them by a sewing machine or welding them by high-frequency welding.

Figure 14E:
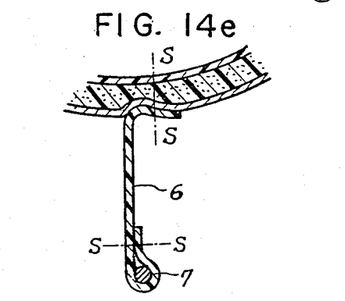
FIG. 14e is an enlarged view of a portion XIVb in FIG. 14b.
Figure 14F:
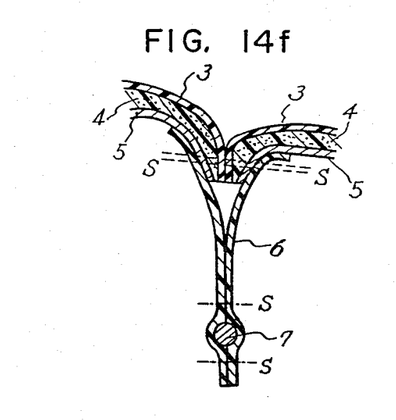
FIG. 14f is an enlarged view of a portion XIVf in FIG. 14c.

The trim cover 1 formed into such a three-dimensional shape is mounted on the molded polyurethane foam 2. Since the trim cover 1 has a concave configuration, it is necessary to pull downward, for example, a portion XIVe in FIG. 14b and a portion XIVf in FIG. 14c. For this purpose, suspension slits 8 are formed in the corresponding portions of the molded polyurethane foam 2, and these portions of the trim cover 1 are pulled by suspension strips 6 and retained by retaining wires 7. As shown in FIGS. 14e and 14f which illustrate the details of the suspension and retaining mechanism, the suspension strip 6 is combined (sewing by a sewing machine or welding by high-frequency welding) to the trim cover 1 at a portion S, and the suspension strip 6 is combined together at another portion 5 adjacent to the lower end thereof to form a loop into which the retaining wire 7 is inserted.

The individual steps of manufacturing such a seat having the illustrated structure require many skilled workers and require also many man-hours as well as heavy labor. Especially, because of the requirement for preparation of various elements including the suspension strips 6, retaining wires 7 and suspension slits 8, the seat is defective in that the cost is high, and the quality is also unstable.

Figure 15A:
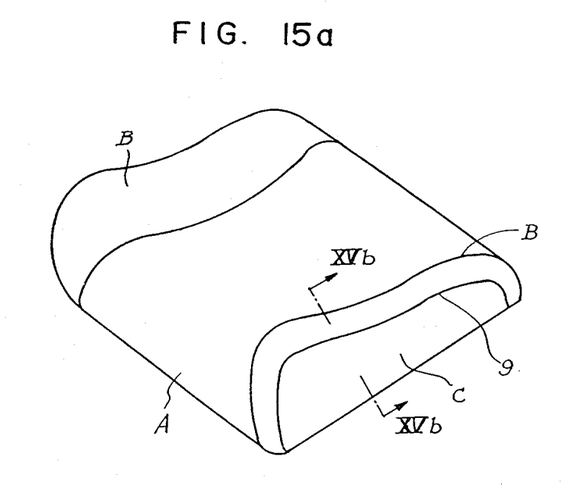
FIG. 15a is a perspective view of a seat which is generally similar to that of FIG. 14a, but in which a joint line is formed on a side of the seat.
Figure 15B:
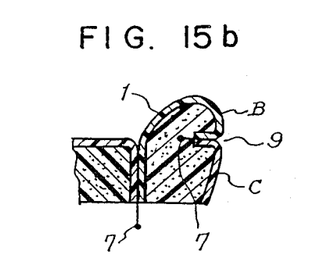
FIG. 15b is a sectional view taken along the line XVb—XVb in FIG. 15a, FIG. 16a is an external perspective view of a third seat.

Another prior art example shown in FIGS. 15a and 15b is a modification of the prior art example described above. The flap part B of the trim cover 1 extends to the side part C and is pulled inward along a line 9. This state is best shown in FIG. 15b. The side part C is also pulled inward along the line 9 and is retained by a retaining wire 7 disposed in the trim cover 1. This structure is advantageous from the aspect of design when different materials, colors, etc. are requested for the flap parts B and side parts C of the trim cover 1. However, the suspension and retaining mechanism is troublesome, and the seat is more disadvantageous than the first-mentioned prior art example from the aspect of manufacture.

Figure 16A:
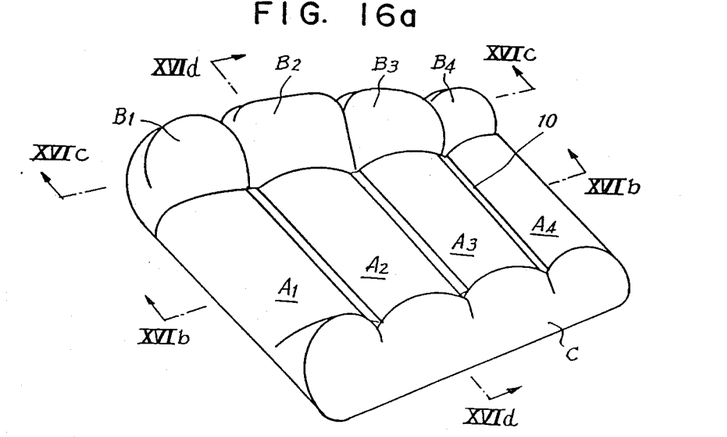
Figures 16B, 16C, 16D, 16E:
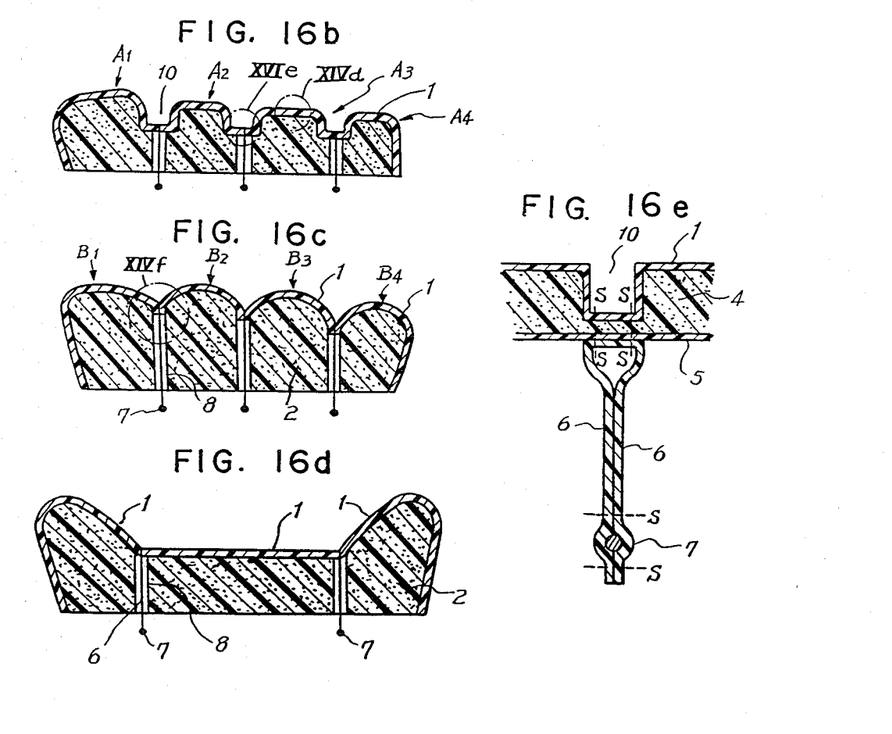

A third prior art example shown in FIGS. 16a to 16e is a seat having a more complex three-dimensional shape. That is, a seat base part of this example includes four ridges $A_1$, $A_2$, $A_3$ and $A_4$, and square grooves 10 as shown in FIGS. 16a and 16b are formed therebetween. In correspondence with the above arrangement, flap parts B have also four ridges $B_1$, $B_2$, $B_3$ and $B_4$ as shown in FIGS. 16a and 16c.

In this example too, as in the case of the aforementioned prior art examples, suspension slits 8 formed in a molded polyurethane foam between the seat base part and the flap parts are utilized to retain the trim cover to retaining wires through suspension strips 6. Similar retaining arrangement is also provided between the ridges of the flap parts as shown in FIG. 16c. Further, in the case of the square grooves 10 formed in the seat base parts, it is necessary to fix the suspension strips 6 shaped to conform to the shape of the square grooves so as to retain the seat base part as shown in FIGS. 16b and 16e.

That is, the flap part B is split into sub-parts $B_1$, $B_2$, $B_3$ and $B_4$ for which respectively different three-dimensional shapes are required. Depending on the specification, the seat base part A may be split into separate sub-parts $A_1$, $A_2$, $A_3$ and $A_4$ (not shown), and, in such a case, a defect similar to but greater than that described already results. The presence of many suspension slits 8 in the molded polyurethane foam 2 and the complexity of the shape of the molded polyurethane foam 2 lead to the possibility of production of many rejects, and the presence of many suspension slits 8 degrades the cushion effect.

In a product proposed for solving the above problem, a highly stretchable one-piece cover member is stretched and bonded to a molded polyurethane foam 2. However, such a highly stretchable cover member is expensive, and the equipment cost that must be invested for carrying out shaping and bonding of the entire cover member is enormous. Also, the possibility of occurrence of folds and wrinkles at the bonded area is high.

DISCLOSURE OF INVENTION

It is an object of the present invention to provide a seat in which a plurality of split cover members are not separately cut as much as possible and are bonded together at necessary portions only, in which the filler pad 4, backing cloth 5, suspension strips, retaining wires, suspension slits, etc. are eliminated to simplify the seat structure, and which can be manufactured without requiring any especial skill thereby reducing the man-hours.

In order to solve the above problems, the present invention employs the following means:

(a) Instead of a continuous one-piece cover member, the present invention uses a cover member cut and split into individual parts or a locally-cut cover member. Portions of the cover member parts to be bonded or necessary portions of the locally-cut cover member are tucked into grooves of a molded polyurethane foam to be bonded together, and the cover member is bonded to the molded polyurethane foam at the necessary portions only to provide a seat.

(b) In the seat thus provided, a filler pad is interposed between the cover member and the molded polyurethane foam.

(c) In the seat described above, necessary portions of the cover member are previously combined.

(d) In the seats described in (a), (b) and (c), a polyurethane resin is foamed and molded integrally with the cover member to bond the cover member to the molded polyurethane foam. According to the means described above, bonding at necessary portions only reduces man-hours, saves the bonding agent and ensures satisfactory feeling of cushion. Combining does not require any especial skill, and use of a fabric or the like as the cover member provides satisfactory air permeability. There is a great degree of freedom for the selection of the material of the cover member. The cover member is not limited to an especially highly stretchable cover member for a pre-shaped seat, and a cover member less expensive can be used.

BRIEF DESCRIPTION OF THE DRAWINGS

FIGS. 1 to 13 relate to the present invention in which

FIGS. 14 to 16 relate to prior art examples, in which FIG. 16b is a sectional view taken along the line XVIb—XVIb in FIG. 16a, FIG. 16c is a sectional view taken along the line XVIc—XVIc in FIG. 16a, FIG. 16d is a sectional view taken along the line XVId—XVId in FIG. 16a, and FIG. 16e is an enlarged sectional view of a portion XVIe in FIG. 16b.

BEST MODE FOR CARRYING OUT THE INVENTION

For clarifying the present invention in further detail, embodiments illustrated in FIGS. 1 to 13 will be described.

Figure 1:
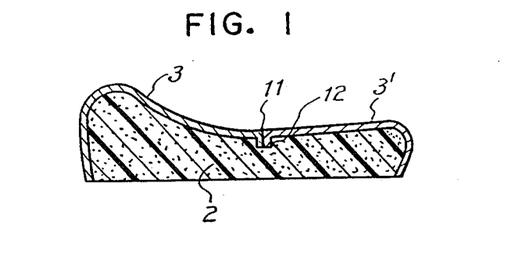
FIG. 1 is a vertical sectional view taken along a longitudinal direction of a seating part of a bucket seat (corresponding to the XIVb—XIVb section in FIG. 14a)
Figure 2:
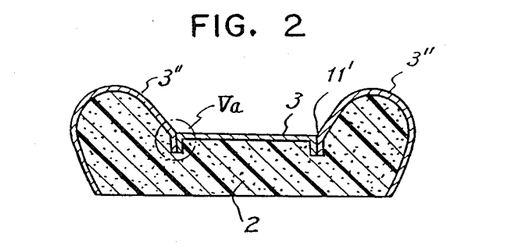
FIG. 2 is a vertical sectional view taken along a transverse direction of the seating part of this bucket seat (corresponding to FIG. 14c)

A first embodiment of the present invention shown in FIGS. 1 and 2 corresponds to the prior art example shown in FIGS. 14a to 14f. That is, the external shape is the same as that shown in FIG. 14a, and FIG. 1 corresponds to FIG. 14b, while FIG. 2 corresponds to FIG. 14a.

It will be apparent from FIG. 1 that, in this embodiment, a cover member 3 is joined to another cover member 3' at an area of a seat base part corresponding to the lowest area of the seat base part where the seat base part is pulled downward by the suspension strip 6 in the prior art example shown in FIG. 14b, and the junction 11 therebetween is bonded to the sides or walls of a groove 12 previously formed in a molded polyurethane foam 2. At concave portions between the seat base part and flap parts too, the cover member 3 providing the seat base part is similarly joined to cover members 3" providing the flap parts, and the junctions 11' therebetween are similarly bonded to the sides or walls of grooves 12' of the molded polyurethane foam 2, as shown in FIG. 2. Such a portion is shown in an enlarged scale in FIG. 5a. As indicated by dotted lines in FIG. 5a, the flap part may be joined to the seat base part at the same height. FIG. 5b illustrates the case where the cover member 3 is tucked and bonded instead of being cut. In this case, the depth D of the tuck may be locally changed so that the cover member conforms to the outer configuration of the molded polyurethane foam. Anyway, by so arranging, the seat has the same finished three-dimensional shape as that of the prior art example shown in FIG. 14 without bonding the other portions. That is, the labor required for suspension and retaining work becomes utterly unnecessary.

In this embodiment, a trim cover as shown in FIG. 14d not used, and the cover member 3 only was used. An Example of this cover member 3 is moquette.

The cover members 3, 3' and 3" may be cut from the same material or from different materials or from a material having different colors.

Figure 5A:
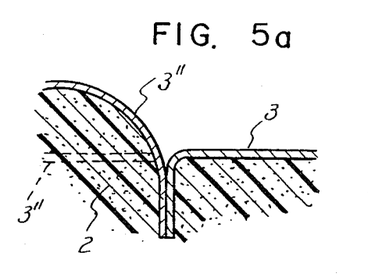
FIG. 5a is an enlarged view of a portion Va in FIG. 2.
Figure 5B:
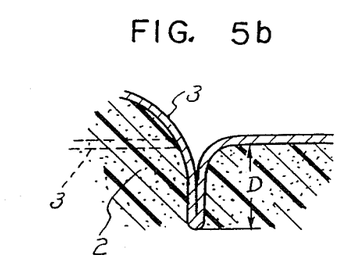
FIG. 5 is an enlarged view of a modification of the portion Va.
Figure 5C:
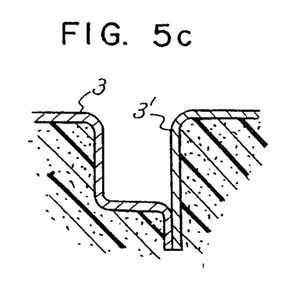
FIG. 5c is an enlarged sectional view of a portion Vc in FIG. 3.
Figure 5D:
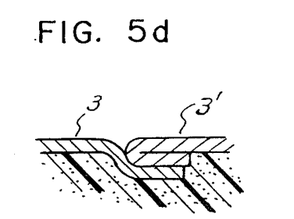
FIG. 5d is a similar sectional view of an example in which cover members are superposed.

FIG. 5d illustrates the case where the cover members 3 and 3' are laid and bonded together.

Figure 3:
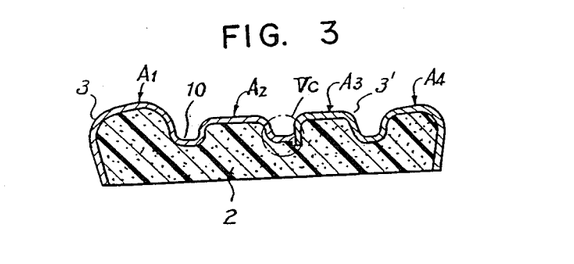
FIG. 3 is a vertical sectional view of another seating part (corresponding to the XVIb—XVIb section in FIG. 16a)
Figure 4:
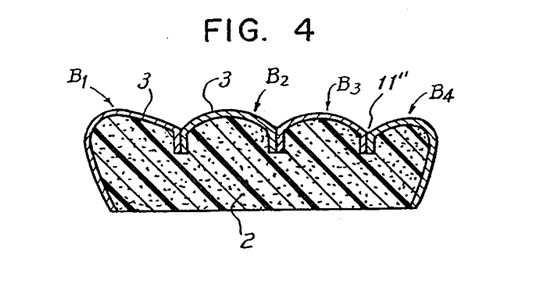
FIG. 4 is a sectional view of a flap part of FIG. 3 (corresponding to FIG. 16c)

FIGS. 3 and 4 show a second embodiment of the present invention which is equivalent to the prior art example illustrated in FIGS. 16a to 16e. That is, FIG. 3 is a vertical sectional view taken along a longitudinal direction of a seat base part and corresponds to FIG. 16b, while FIG. 4 is a vertical sectional view taken along a longitudinal direction of a flap part and corresponds to FIG. 16c.

It will be apparent from FIG. 3 that cover members 3 and 3' are bonded to a molded polyurethane foam 2 in square grooves 10. The cover members 3 and 3' are joined in a square groove portion indicated by Vc. FIG. 5c is an enlarged view of this portion Vc, and the square groove formed in the molded polyurethane foam is further depressed downward at the position of the junction between the cover members. At this portion Vc too, the cover members 3 and 3' are securely bonded to the molded polyurethane foam. However, the entirety of the seat base part may be formed of the cover member 3 only when such is required.

FIG. 4 illustrates that the cover member 3 forming portions $B_1$, $B_2$, $B_3$ and $B_4$ of the flap part B is cut into pieces conforming to plane-developed patterns of the three-dimensional shapes of the respective portions, and such pieces are buried in grooves of the molded polyurethane foam 2 and bonded at their junctions 11''.

The manner of inserting the cover member(s) into the molded polyurethane foam 2 are in no way limited to those shown in FIGS. 5a, 5b and 3c, and various shapes and methods may be employed depending on the specification. The cover members 3, 3' and 3'' shown in FIGS. 5a, 5b, 5c and 5d, as well as the side parts C and flap parts B, may be previously combined as by machine sewing so as to facilitate the work or from a structural requirement, from an appearance requirement, etc.

Figure 6A:
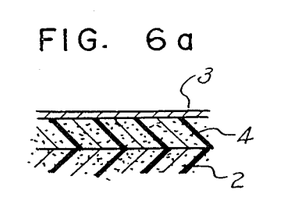
FIG. 6a is a sectional view of an example in which a filler pad is interposed between a cover member and a molded polyurethane foam.

FIG. 6a illustrates a structure in which a filler pad 4 is interposed between a molded polyurethane foam 2 and a cover member 3. This structure can exhibit the soft feeling of the filler pad. The filler pad 4 and the cover member 3, and the filler pad 4 and the molded polyurethane foam 2 are bonded at necessary portions. Depending on the specification, the cover member 3 and the filler pad 4 may be previously laminated to be wholly bonded together.

Figure 6B:
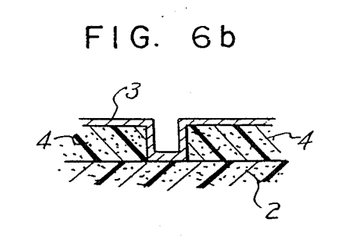
FIG. 6b is a sectional view of an example whose purpose is the same as that the FIG. 6a and in which a groove is formed.

FIG. 6b, the purpose of which is similar to that of FIG. 6a, illustrates another method of forming the square groove 10 shown in FIG. 3. The cover member 3 may be laminated on its entire rear surface with a polyuretane coating having a thickness of about 1 to 2 mm.

The portions $B_1$, $B_2$, $B_3$ and $B_4$ of the flap part shown in FIG. 4 were combined as by machine sewing into required three-dimensional shapes after cutting individual plane-developed patterns of these portions. Although not illustrated, the portions $A_1$, $A_2$, $A_3$ and $A_4$ of the seat base part may be similarly made.

Figure 8:
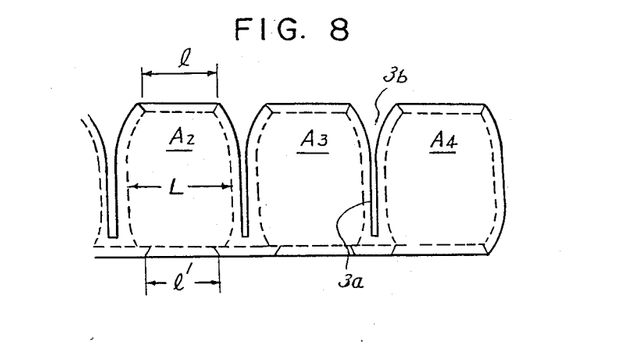
FIG. 8 is a sectional view of an example in which cutouts are formed on a single cover member, and the cover member is bonded at the cutout portions.
Figure 9:
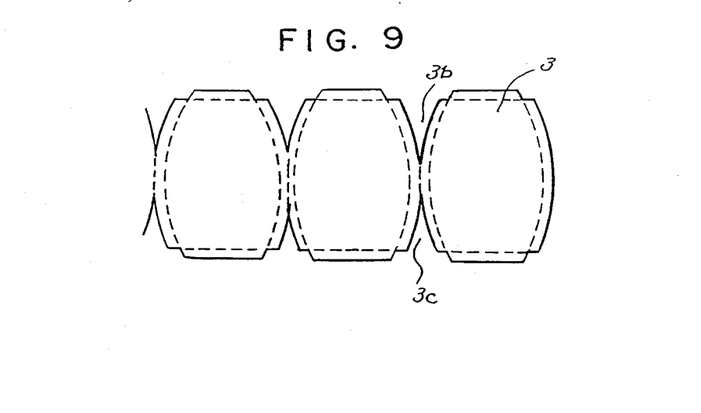
FIG. 9 is a sectional view of an example in which upper and lower cutouts are formed.

In such a case, cutouts 3a are formed on a single cover member 3 as shown in FIG. 8, and such a cover member 3 is tucked into a molded polyurethane foam 2 at portions outer than the dotted lines and is then bonded to the molded polyurethane foam 2. By suitably selecting the relation $L > 1 > l_1$, the height of the three-dimensional shapes can be changed. Although not illustrated, an upper portion 3b of each of the cutouts 3a may be eliminated to leave an uncut portion similar to the lower portion, and the central cutouts 3a may only be formed. In contrast, FIG. 9 illustrates that upper cutouts 3b and lower cutouts 3c are formed. The cover member 3 shown in each of FIGS. 8 and 9 is not separated but is in a continuous one-piece form. Therefore, the cover member 3 can be easily handled to reduce man-hours, to improve the yield rate of the material, and to eliminate fluctuations of the resultant shape. The local cutting of the cover member 3 is not limited to the shapes shown in FIGS. 8 and 9 and may be suitably modified to meet any requirement for the three-dimensional shape.

Figure 10:
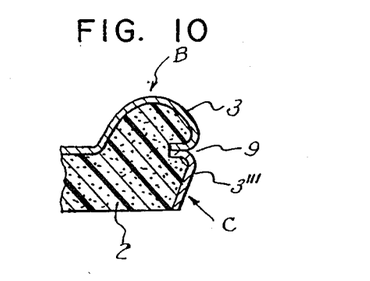
FIG. 10 is a vertical sectional view taken along a transverse direction of an embodiment in which a flap part of a cover member is extended to a side of a seat and tucked together with a side-part cover member into a molded polyurethane foam (corresponding to the XVb—XVb section in FIG. 15b)

In an embodiment shown in FIG. 10, the aforementioned prior art seat shown in FIGS. 15a and 15b, that is, the seat having the side joint line 9 between the flap part and the side part is formed according to the present invention. According to the present invention, a cover member 3 providing the flap part B is extended to the side face of the seat as shown in FIG. 10, and, at this side face, the end edge of the cover member 3 is buried, together with the end edge of a cover member 3''' providing the side part C, into an insertion groove formed in a molded polyurethane foam 2 to be bonded together. According to such an arrangement, the troublesome mechanism required for achieving suspension inside the molded polyurethane foam shown in FIG. 15b becomes utterly unnecessary.

Figure 7:
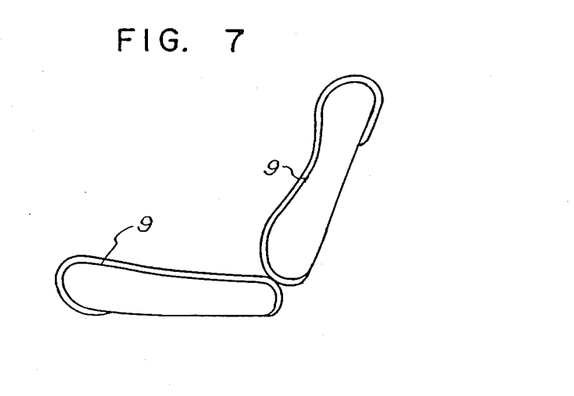
FIG. 7 is a schematic vertical sectional view of an example of a front back and a seating part to which the present invention is applied.
Figure 11:
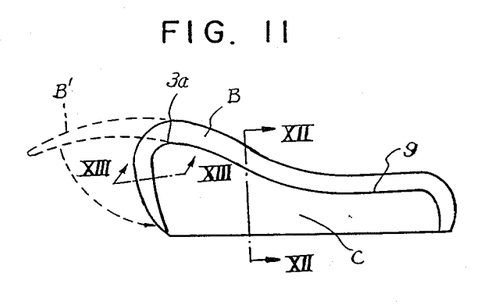
FIG. 11 is a side elevation view of an embodiment in which a line is formed on a side of a seat as in the case of the embodiment shown in FIG. 10, but in which the same single cover member is used.
Figure 12:
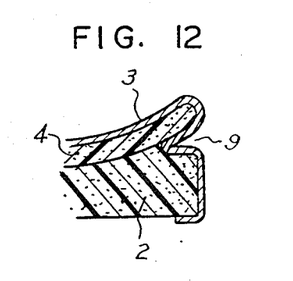
FIG. 12 is a sectional view taken along the line XII—XII in FIG. 11, and FIG. 13 a sectional view taken along the line XIII—XIII in FIG. 11.
Figure 13:
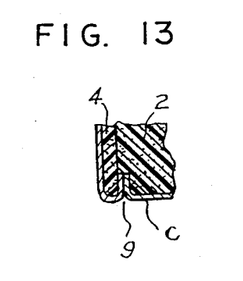

FIGS. 11 to 13 show a modification in which a filler pad 4 is used in the seat having the side joint line 9 described above. In this case, a one-piece cover member 3 as shown in FIG. 12 is used and tucked between and bonded to the molded polyurethane foam 2 and the filler pad 4 thereby forming the joint line. It is needless to mention that the cover member 3 may be previously cut at the joint line 9. The front end portion B' of the flap part B is provided by wrapping the filler pad 4 in the cover member 3, then bending the combination downward as shown by the arrow, and fixing the combination to the side part C. FIG. 13 is an enlarged sectional view of the front end portion B' after being affixed. This bent end portion may be further extended to a lower portion of the seating part or to a rear portion of the front back as shown in FIG. 7.

When the molded polyurethane foam 2 is formed integrally with the cover member 3 having anyone of various shapes as described above, the cover member 3 is bonded to the molded polyurethane foam 2. In the case of a prior art cover member in the form of a fabric, the urethane solution permeates into the fabric thereby hardening the fabric. In order to prevent this permeation, lamination of the filler pad or other material is commonly done. Also, there is a method in which the rate of foaming is accelerated to lessen the permeation. As another means, a heat-fusible film for preventing permeation of the urethane solution may be interposed between the filler pad and the molded polyurethane foam. When the polyurethane foam is molded integrally with the cover member by foaming according to a prior art practice, it has been very difficult to repair cavities formed near the surface of the molded polyurethane foam, resulting in a high reject rate. According to the split cover member of the present invention, such cavities can be repaired from the side of the cover member, so that the reject rate can be greatly decreased.

Thus, a fabric which is unstretchable or scarcely stretchable can be used as the cover member 3.

The side part C may be separately prepared and combined with the other part through welts (not shown) or without the use of welts. Or, the side part C may be separated from the flap part by a joint line 9 as shown in FIG. 11. Or, a suitable cutout or cutouts as shown in FIGS. 8, 9 or 10 may be formed in the flap part B, and such a flap part B may be combined integrally with the side part C. The tucked portion of the cover member is in no way limited to those illustrated in the figures described above and, the cover member may be tucked at any other required portion.

The molded polyurethane foam 2 and the cover member 3 are bonded together. Therefore, the surface of the molded polyurethane foam 2 may be entirely skinless or the skin may be removed from only the portions required for bonding. The molded polyurethane foam 2 is bonded to or integrally foamed with the filler pad 4. Further, depending on the specification, the molded polyurethane foam may be wholly bonded to the cover member.

The bonding agent may be such that it can be sprayed or applied by hand, or may be in the form of powders of a heat-fusible bonding material, or in the form of a cloth, a film, a tape, a velvet cloth or the like of such a bonding material. Or, a heat-fusible bonding material may be previously coated on the cover member.

The present invention is in no way limited to a seat and is also applicable to, for example, vehicles internal equipments or articles of furniture.

The present invention obviates the prior art defects pointed out in the beginning of the specification. Further, the present invention provides the following advantages:

(a) The backing cloth 5, suspension strips 6, retaining wires 7 and suspension slits 8 required hitherto are eliminated, and bonding is applied to necessary portions only. Therefore, the bonding agent can be saved, the material costs can be saved and the manufacturing cost can be reduced.

(b) Use of a fabric or the like as the material of the cover member improves the air permeability.

(c) An ordinary material (a fabric or a vinyl leather) commonly used to provide a trim cover can also be used as the material of the cover member. Therefore, a cover member which is not stretchable or is stretchable to a certain extent only can also be used, so that the degree of freedom of selection of the cover material is large, and the cover member is less expensive than an especially highly stretchable cover member for a pre-shaped seat. Further, the cover member may be shaped by heating depending on the material of the cover member.

(d) In the case of the overhang type shown in FIG. 11, the overhang structure can be provided by bending and bonding a shape shown by the dotted lines, and wrinkles may be produced on this overhang portion.

(e) The reject rate of the molded polyurethane foam is decreased.

Industrial Applicability

The aforementioned embodiments have referred to an application of the present invention to a bucket seat for use in an automotive vehicle. However, it is apparent that the present invention is in no way limited to the bucket seat and is also applicable to various other seats for use in an automotive vehicle and to chairs and articles of furniture.

What is claimed is:

1. A seat characterized in that an unstretchable or substantially unstretchable, one-piece cover member is secured to the body of the seat comprising a molded, elastic member having an uneven upper surface, said cover member having cut-out portions formed around the end edges thereof allowing said cover member to conform to an overall three-dimensional shape of the seat, said body of the seat having grooves formed therein in which said end edges and said cut-out portions are buried, the buried end edges of said cover members are bonded to said groove, and said cover members are free from said elastic member at the remaining area.

2. A seat as claimed in claim 1, characterized in that the buried end edges of said cover members are bonded to walls of said groove.

3. A seat as claimed in claim 1, wherein said elastic member is a molded polyurethane foam or a molded slab of foamed polyurethane.

4. A seat as claimed in claim 3, characterized in that a filler pad is interposed between said cover member and said molded polyurethane foam or said molded slab.

5. A seat characterized in that an unstretchable or substantially unstretchable, one piece cover member secured to a seat comprising a molded elastic member having an uneven upper surface, said cover member conforming to an overall three-dimensional shape of the seat by forming cut-out portions around the end edges forming shaped portions in the cover member, said molded elastic member having grooves formed therein in which said end edges and said cut-out portions are buried such that said shaped portions conform to said three-dimensional shape, the end edges of said cover member being bonded to walls of said groove, and said cover member is free from said elastic member at the remaining of said cover member.

* * * * *